US008584529B2

(12) United States Patent
Fisher et al.

(10) Patent No.: US 8,584,529 B2
(45) Date of Patent: Nov. 19, 2013

(54) CRANK ARM WITH STRAIN AMPLIFIER

(75) Inventors: Mark Fisher, Lismore (AU); Leslie James Wills, Londonderry (AU)

(73) Assignee: Mark Fisher, New South Wales (AU)

( * ) Notice: Subject to any disclaimer, the term of this patent is extended or adjusted under 35 U.S.C. 154(b) by 561 days.

(21) Appl. No.: 12/667,859

(22) PCT Filed: Jun. 30, 2008

(86) PCT No.: PCT/AU2008/000957
§ 371 (c)(1),
(2), (4) Date: May 12, 2010

(87) PCT Pub. No.: WO2009/006673
PCT Pub. Date: Jan. 15, 2009

(65) Prior Publication Data
US 2010/0263468 A1    Oct. 21, 2010

(30) Foreign Application Priority Data
Jul. 6, 2007    (AU) .................................. 2007903670

(51) Int. Cl.
*G01B 7/16*    (2006.01)
*G01L 1/00*    (2006.01)
(52) U.S. Cl.
USPC ................................. 73/782; 73/760; 73/781
(58) Field of Classification Search
USPC ........... 73/379, 760, 763, 769, 773, 781, 782; 702/41, 42, 43
See application file for complete search history.

(56) References Cited

U.S. PATENT DOCUMENTS

| 4,463,433 | A  | * | 7/1984  | Hull et al. ...................... 702/41 |
| 5,027,303 | A  | * | 6/1991  | Witte .............................. 702/44 |
| 8,065,926 | B2 | * | 11/2011 | Meyer ....................... 73/862.338 |

FOREIGN PATENT DOCUMENTS

| EP | 1 362 552 A1 | 11/2003 |
| EP | 1362552 A1 | 11/2003 |
| WO | WO 97/02174 | 1/1997 |
| WO | WO 97/02174 A1 | 1/1997 |
| WO | WO 2008/058164 A2 | 5/2008 |

OTHER PUBLICATIONS

Authors: Kevin M. Lynch and Michael A. Peshkin, Title: "Linear and Rotational Sensors", Date on Web: May 28, 2005, URL: http://lims.mech.northwestern.edu/~lynch/papers/mechatronicsHB/mechatronicsHB.pdf, Publisher: Northwest University, pp. 1-15.*

* cited by examiner

*Primary Examiner* — Lisa Caputo
*Assistant Examiner* — Roger Hernandez-Prewitt
(74) *Attorney, Agent, or Firm* — Christie, Parker & Hale, LLP

(57) ABSTRACT

A crank arm (200) includes a mechanical ring amplifier (232), having a cavity and a connecting bridge (140), to amplify the radial strain exerted on the crank arm by a rider. Strain sensors (234, 235) are positioned to detect the amplified radial strain. The crank arm (200) may include further strain sensors (228, 229) adapted to detect tangential strain on the crank arm, allowing both the tangential and radial forces exerted by a bicycle rider to be measured. The crank arm (200) may also comprise means for adjusting the position of a pedal axle relative to the crank arm, via the loosening, rotation and retightening of a carrier disc held by the crank arm, where the carrier disc has an eccentrically mounted aperture for holding the pedal axle.

31 Claims, 9 Drawing Sheets

CRANK ARM WITH STRAIN AMPLIFIER

CROSS-REFERENCE TO RELATED APPLICATION

This application is a National Phase Patent Application and claims the priority of International Application Number PCT/AU2008/000957, filed on Jun. 30, 2008, which claims priority of Australian Patent Application Number 2007903670, filed on Jul. 6, 2007.

FIELD OF THE INVENTION

The present invention relates to improvements in devices associated with the crank arms of a bicycle.

BACKGROUND OF THE INVENTION

There are several field devices to measure the power developed by a bicycle rider. In general, conventional apparatuses have measured only the tangential force ("$F_{TAN}$") component (or torque force), or some manifestation of it such as the torque generated in the bicycle driving sprocket due to the pedal force.

Conventional strain multipliers are not designed or intended to be accurate in the presence of off axis forces, or around axis torque, and as such, would not retain accuracy during normal usage on a bicycle. Some conventional strain measurement devices are adapted to measure the radial force component ("$F_{RAD}$"), by placing sensors on the sides of the crank arm near sensors intended to measure $F_{TAN}$. These devices do not deliver an optimal level of accuracy because the positioning of the sensors fails to adequately take into consideration the small magnitude of the forces acting upon the crank arm.

The maximum force that a powerful athlete can apply to the vertical crank is about three times body weight, or around 3500N. This generates the maximum value of the force $F_{RAD}$. Since the cross sectional area of the crank is typically 350 mm² then the maximum stress generated by the force in the bicycle crank arm will be 10 MPa. The bicycle crank is often constructed from high grade aluminium for which the Young's modulus is known to be approximately 70 GPa.

The formula relating stress and strain in the material is given by $E_{(Young's\ modulus)}$=Stress/Strain. From this formula we get the strain in the material to be Strain=Stress/E=10×10^6/70×10^9=1/7000. Thus, the maximum signal generated at the strain gage in a direct application to measure strain will be: Signal=Strain×Bridge supply voltage×gage factor (of the strain gage) volts=(1/7000×3.5×2) volt=0.001 volt.

The analog system in a mixed signal microcomputer is particularly accurate if this maximum signal is amplified to a value similar to the working reference voltage. The signal needs to be a typical maximum, e.g., 3.5 volt, and therefore would be amplified by 3500 to be a signal suitable for processing. It is well known to those skilled in the art that it is difficult to achieve such a high gain and simultaneously achieve low power, low thermal drift and low noise in the amplifier system.

SUMMARY

In contrast to the difficulties mentioned in the Background, with a mechanical strain amplifier incorporated, the sensing bridge output signal with the same drive voltage can be 0.04 volt at the strain gage output. Since the direct measurement of strain only outputs 0.001 volt, then measuring with the strain amplifier is 40 times as sensitive to radial force as the direct method of measuring the radial strain without a strain amplifier. In the strain amplifier case, to amplify the bridge to the same 3.5 volt only requires an electronic gain of 3.5/0.04, or approximately 90. This may be achieved with a number of commercial instrumentation amplifiers.

The crank electronics and the strain gages need to preferably be powered by a battery. Strain gages often have a low resistance, typically 350 ohm. In order to keep the battery current consumption low, it is necessary to either reduce the voltage drive to the gages, or to strobe the voltage drive to the gages so that the voltage to them is ON only when the gages are being read, and OFF when not being read. It is preferred to strobe the voltage drive to the gages as a reduction in the voltage drive will require very high electronic gain, and hence lower frequency response of the amplifier.

In general this system may be self contained with an on-board battery and recording system. It requires no external cables to function in the field on a normal bicycle. It also accommodates the fitment of standard pedals.

The applied vector force at a pedal of a bicycle, in the plane of rotation, can be resolved into two orthogonal components. The two components are $F_{TAN}$, at right angle to the pedal crank, and $F_{RAD}$, along the pedal crank long axis. Knowing the magnitude of the two components, it is possible to calculate the direction of the resultant vector relative to the crank long axis. In a preferred aspect this apparatus provides a means to measure the angle of the crank at the simultaneous time the two component vector forces are recorded. If the crank angle in space and the vector angle relative to the crank are known, then it is possible to deduce the angle of the force in space and define a new force vector acting on the crank in space. This is the spatial force applied by a rider.

The two force components of the vector are measured preferably using strain gages or sensors bonded to an elastic material, often aluminium, from which the crank arm is manufactured. Electronics mounted in the crank centre housing amplifies and digitizes the small signal from the strain gages at an exemplary nominal sampling frequency of 100 samples per second. The digitized signal is then transmitted by crank electronics through a rotary transformer to a hub receiver mounted on the bicycle frame. In a preferred aspect the hub receiver has the following functions and facilities: two rotary transformers as inputs to receive the digitized data from the left and right crank arms, a device for measuring the crank arm angle, a real time clock for time stamping the measurements, an output port for connecting in real time to a personal computer, a memory storage module for storing the data in field measurements and a battery to power the hub in the field.

Determination of the magnitude of the two independent principal force vectors in a bicycle crank arm optimally needs the measurement of the two vectors with preferably little contribution from out of plane forces and in the presence of considerable torque around the long axis of the crank arm. One way of eliminating the contributions of unwanted forces is to measure the forces of interest on, or about, the appropriate neutral axis. Another preferred need for a field instrument is that power consumption from the battery supplying the electrical power be kept low so that the system does not require frequent battery changes in operation. A further preferred need is to provide a computer compatible output means, and a computer compatible storage means for field work.

In one aspect the invention resides in a crank arm for a bicycle, including: an elongate body having a pedal connection in one end portion and an axle connection in an opposite end portion, a mechanical strain amplifier formed within the body between the pedal connection and the axle connection, and a strain detector located in or on the amplifier.

Preferably the strain amplifier is structured to selectively amplify the effect of a force originating at the pedal connection and acting longitudinally in the body. Preferably the strain detector is located and oriented to selectively detect a force originating at the pedal connection and acting longitudinally in the body, but not to bending strains in the body.

Preferably the strain amplifier is formed by a cavity in the body containing a web located on or about a central plane of the body. The cavity is preferably an aperture through the body between a pair of oppositely shaped arms which are responsive to compression and/or tension forces along the body.

The web is generally connected to the body through a set of legs and more preferably through a pair of legs aligned along the body and another pair of legs aligned across the body. Preferably at least one strain detector is mounted on the web. Preferably the strain detector is a strain gage, or multiple gages, located on one or more legs of the web.

In one embodiment the bridge includes a pair of strain gauges connected in a half bridge and mounted about the neutral axis in bending of the crank arm. In general, the strain detector comprises a multiplicity of strain gauges connected in a full bridge arrangement on opposite sides of the neutral axis in bending of the body.

In general terms the pedal connection and the axle connection have parallel axes which are perpendicular to a central plane of the body. The body has a longitudinal axis located in the central plane and passing through the axes for the pedal connection and the axle connection. The pedal connection and the axle connection are respective apertures.

In general, the crank arm also includes a second strain detector located and oriented on the body to detect torque about the axle connection. Processing electronics and a set of wires connect the strain detectors to part of a rotary transformer at the axle connection.

In another aspect the invention resides in a method of determining force exerted by a rider on a bicycle crank arm, including: receiving radial strain data from a first strain detector located in a strain amplifier in the crank arm, receiving tangential strain data from a second strain detector located on the crank arm, and analysing the strain data to determine the force exerted by the rider on the crank arm. In general, strain data is received from both crank arms of the bicycle.

In general, a strain amplifier incorporated into the crank arm measures $F_{RAD}$, the radial strain in the crank arm. Preferably it is not cross coupled to the bending moment in the crank arm, the shear force in the crank arm, off axis forces or around axis torque. In a preferred aspect, the present invention permits the ability to measure tangential and radial loads at all angles of the crank arm during the rotational cycle of the arm with superior accuracy.

The invention also resides in any alternative combination of features which are indicated in this specification. All equivalents of these features are deemed to be included whether or not explicitly set out.

DETAILED DESCRIPTION OF THE DRAWINGS

Referring to these drawings it will be appreciated that the invention can be implemented in various ways, and these embodiments are given by way of example only. Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow. Wherever possible, like numbers will refer to like parts. References to "left," "right" and "centre" are for illustrative convenience only as would be appreciated by a person skilled in the art.

Figure 1:
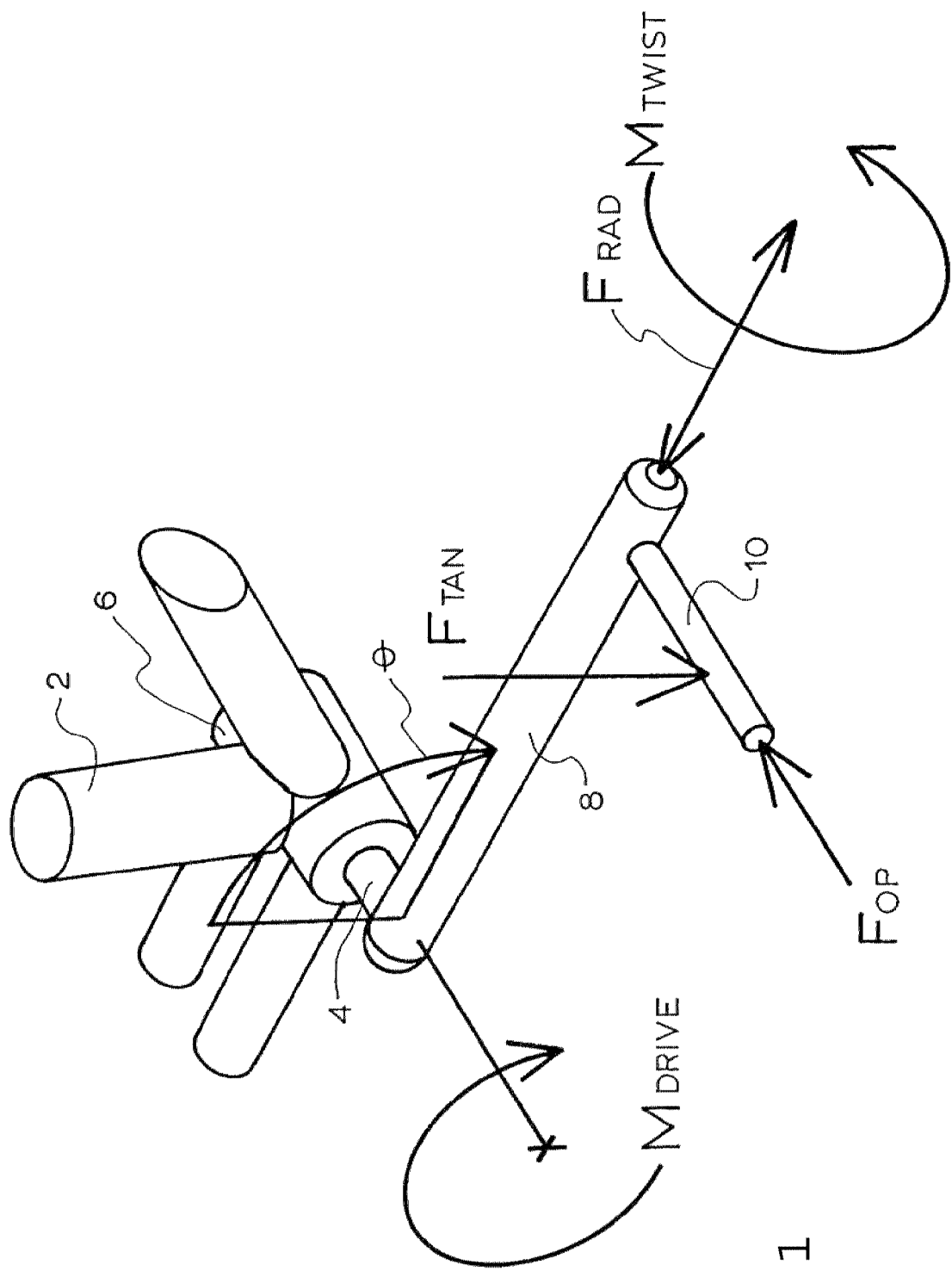
FIG. 1 shows part of a bicycle frame, a single crank arm, and the principal forces acting on it.

FIG. 1 shows part of a bicycle frame 2, having crank axle 4, crank axle housing 6, and crank arm 8 to which is attached pedal 10. When force is applied to the pedal 10, it can be represented as the components $F_{TAN}$ and $F_{RAD}$. $F_{TAN}$ is the force normal to the crank arm long axis and in the plane of rotation of the crank. $F_{RAD}$ is the force along the crank long axis and directed to and orthogonal to the crank axle. $F_{TAN}$ is the force which produces the moment $M_{drive}$ around the centre axle. $M_{drive}$ is the driving torque of a bicycle.

There is also a smaller force, an out of plane force ("$F_{OP}$"), which is preferably decoupled out of the measurement. The force $F_{TAN}$ is applied to the pedal at distance, usually about 60 mm, from the crank arm.

This produces a large torsional moment $M_{twist}$, of little interest in this application, in the crank arm. This force is consequently decoupled out of the measurement. For completeness, each reading of the force vectors is preferably associated with the crank angle.

Figure 2:
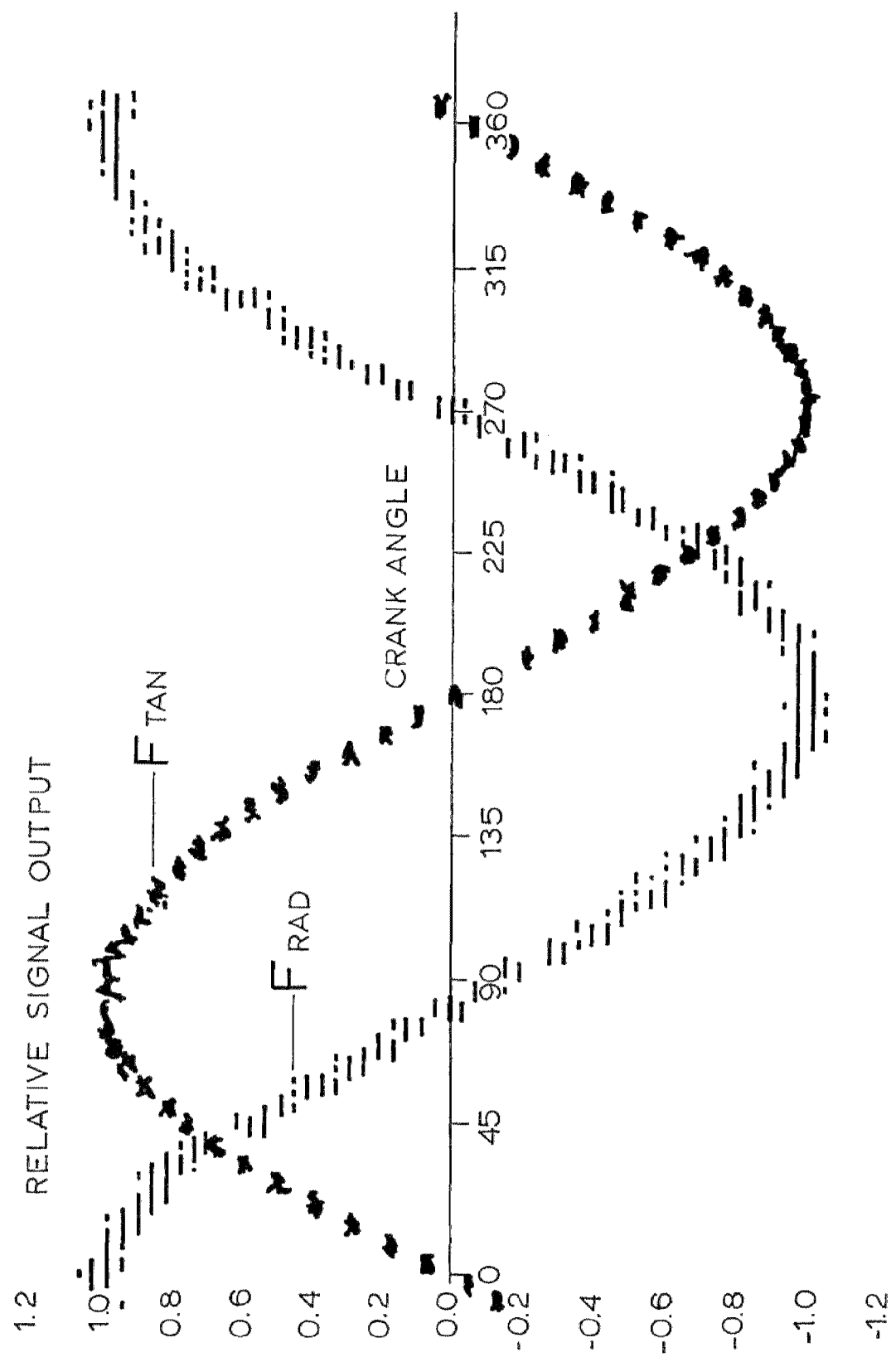
FIG. 2 is a graph of tangential and radial force components measured during a typical full rotation of a crank arm in response to a calibration sinusoidal input force.

FIG. 2 is a graph which illustrates the crank and typical system performance. In the test performed for collection of the data for the graph, a weight of 10 Kg is applied to both pedals. The crank system is rotated slowly and the output from each sensor system is recorded and plotted against crank angle. There are two traces on the graph. The trace $F_{TAN}$ is presentation of the values from the tangential sensor, representing the force $F_{TAN}$. The trace $F_{RAD}$ is presentation of the values from the strain ring sensor (described below), representing the force $F_{RAD}$. The maximums of the two traces are out of phase by 90 degrees. $F_{RAD}$ has maximum value when the crank is vertical, or 0 degrees. $F_{TAN}$ has maximum value when the crank angle is horizontal, or 90 degrees. It follows that the crank will measure the orthogonal two force vectors relative to the crank.

Figure 3:
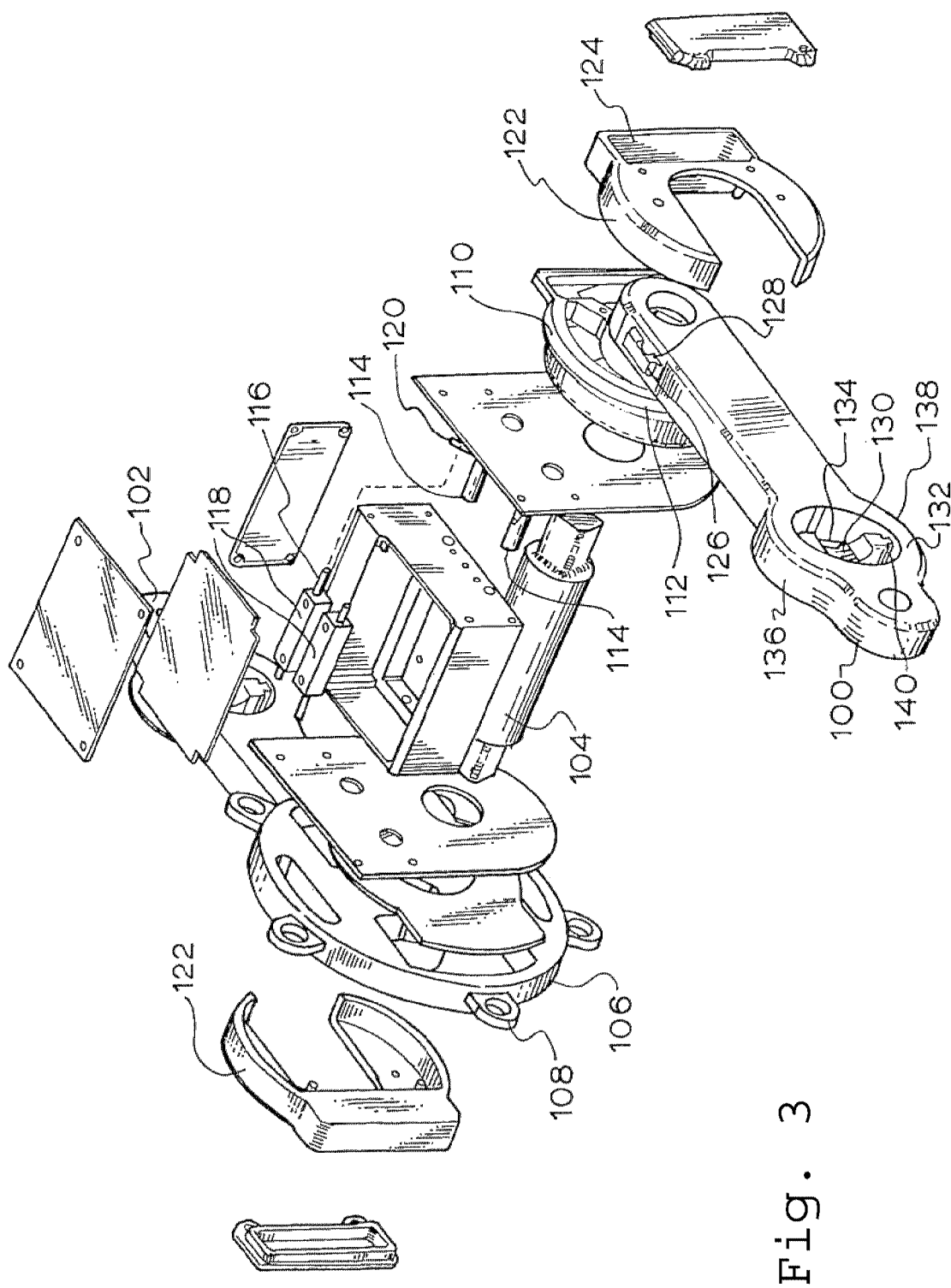
FIG. 3 is an exploded perspective view of two crank arms joined by a bearing axle in accordance with a preferred embodiment of the present invention.

FIG. 3 shows two bicycle cranks, a left, off side crank 100 and right, drive side crank 102 joined by a crank axle 104.

Crank axle 104 runs in, and is confined by the standard bearings in the bottom bracket of a bicycle frame.

Right side crank 102 is provided with a housing member 106 for the mounting of a normal bicycle driving chain ring attached by means of mounting lugs 108. Left side crank 100 is provided with a housing member 110 which has a face cam 112 formed on the outside surface. Two cam followers 114 are in contact with face cam 112 and the followers actuate the plungers 116 of linear sliding potentiometers 118 by means of pins 120. The linear sliding potentiometers are used to generate a signal for the electronic system which indicates crank angle. Both cranks are provided with a cover 122 having provision for a battery compartment 124 and to provide protection for bending strain gages (described in further detail below).

The measuring system of the present invention preferably includes two sets of sensor systems. A first detector system 126 is preferably adapted to detect and transmit information related to $F_{TAN}$ and includes strain gages or sensors 128. A second detector system 130 is preferably adapted to detect and transmit information related to $F_{RAD}$ and includes strain amplifier 132 and strain gages or sensors 134.

The output signals from the monitoring gages are,
a. a voltage proportional to $F_{TAN}$ from bending strain gages 128,
b. and a voltage proportional to $F_{RAD}$ from strain amplifier gages 134.

Each of the two cranks is preferably equipped with strain gages 128 and 134 for measuring the strains in the crank arm material. Gages 128 are preferably positioned near the centre axle of the bicycle so that the large strain due to bending of the crank arm is measured. The longitudinal grids of gages 128 are preferably located to obtain a signal of maximum amplitude from bending of the crank in the plane of rotation. Gages 128 are aligned so that the centre line of the strain grid is on the neutral axis for lateral bending of the crank arm. Lateral bending is due to any force $F_{OP}$ in any axis orthogonal to the plane of rotation of the cranks.

FIG. 3 shows one implementation of bridge design in the strain amplifier for measuring the radial strain. Strain along the crank axis due to $F_{RAD}$, is seen and amplified by strain amplifier 132. Amplifier 132 is preferably configured as a ring amplifier having arcuate upper and lower members 136, 138. Provided within strain amplifier 132 is a connecting bridge 140 mechanically connected to the strain amplifier. Connecting bridge 140 is preferably connected in at least two places to strain amplifier 132, e.g., at upper member 136 and at lower member 138.

Gages 134 are provided to measure radial strain along the long axis of the crank. As shown in FIG. 3, gages 134 are preferably located in mechanical strain amplifier 132 built into crank arms 100, 102. Strain gages 134 are preferably bonded to connecting bridge 140 with alignment that is sensitive to the tensile or compressive strain in the bridge. Gages 134 are simultaneously sensitive to tensile or compressive strain along the long axis of the crank.

Figure 4:
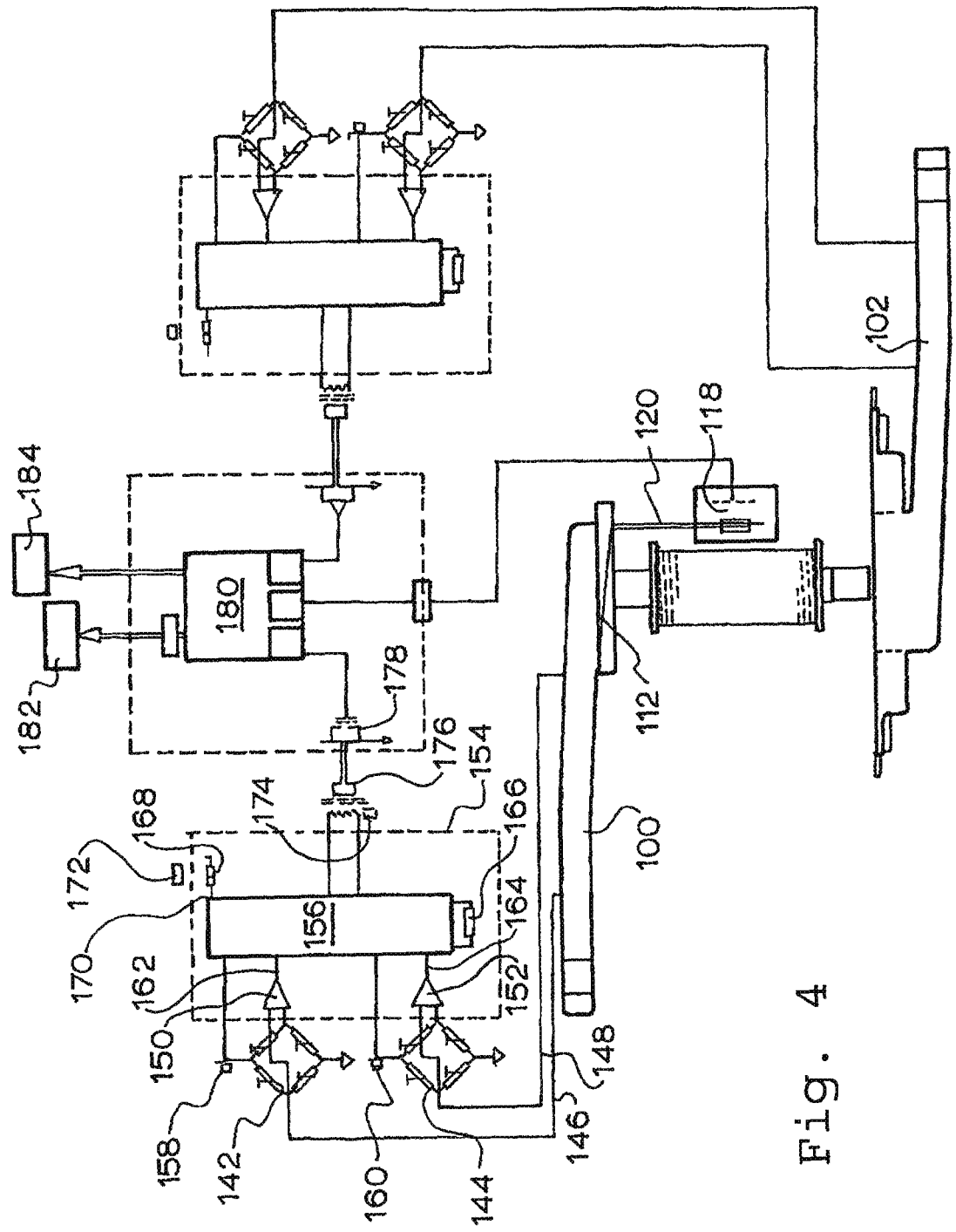
FIG. 4 is a schematic electronic circuit diagram for the system of FIG. 3.

FIG. 4 shows a preferred schematic diagram for the embodiment of FIG. 3. Unless otherwise indicated, the description with respect to the circuit associated with left, off side crank arm 100 will be understood to apply to that of right, drive side crank arm 102. As shown in FIG. 4, crank 100 preferably has associated with it strain gage bridge arrangements 142, 144. The relative position of each strain gage bridge on the crank is indicated by the diagrammatic transfer lines 146, 148. Transfer line 146 is the signal path of the strain gage bridge in the strain cell of offside crank 100. The physical strain gage is located within the strain cell, but is shown displaced in the schematic drawing to be shown as input to instrumentation amplifier 150.

Similarly transfer line 148 is the signal path of the connections to the bending strain sensor of offside crank 100. The physical strain gage is bonded to the crank, approximately in the position shown, but in this drawing is shown as bridge 144, which is input to instrumentation amplifier 152.

The strain bridges have physical position bonded to the respective crank. In this description of the circuit elements, they are shown in closer relation to the electronic circuitry of which they are a functional part. The circuitry for processing the signals from strain gages is mounted on crank mounted printed circuit board 154 mounted in electronic housing integral with the crank. A small signal from each of the strain gage bridges is amplified by instrumentation amplifiers 150, 152 to a voltage level suitable for input to microcomputer 156.

Referring to FIG. 4, each strain bridge is enabled by a switch 158, 160, respectively, in synchronism with the reading of the bridge by the microcomputer analog inputs 162, 164. Strain gages in common use have a low resistance, typically 350 ohm, and therefore the current to drive the strain gage continuously is larger than the current consumed by the microcomputer in this application. By strobing the bridge current only to be ON a small part of the time, a considerable lowering of the supply current is achieved. When a mechanical strain amplifier is not used, the technique of strobing the bridge ON only when a reading is made is very difficult to achieve with the low noise amplifiers needed. This difficulty arises because the low noise amplifiers needed are chopper stabilised and the chop frequency needs to be synchronised with the sampling frequency. Most chopper stabilised amplifiers with an internal electronic chopper do not have a synchronising facility provided. Additionally, synchronising at such a high system sampling frequency is difficult.

Typically when the microcomputer is programmed to read strain gages at 100 times per second, the affect of strobing the bridge drive as this invention practices will lower the average bridge current to about 5% of the fully ON current. Therefore the battery 166, which powers the crank circuit, has its capacity extended by the combined use of the strain amplifier and the strobing technique.

Crank microcomputer 156 is also provided with a reed switch 168 having microcomputer input 170. When the crank rotates, the reed switch is activated by a stationary magnet 172 fixed to the bicycle frame. Activation of the reed switch by the magnet serves to signal the microcomputer to remain in running mode and take continuous readings of the strain gages. When the reed switch is not activated for a predetermined time, typically several minutes, the microcomputer program enters a sleep mode and puts the crank electronics into a shutdown phase reducing the battery power required to a very low level. The microcomputer restarts again when the reed switch is activated.

Each pair of readings from the two strain gage bridges is transmitted out of the crank through rotary transformer transmit coil 174. The transmitted signal is received by stationary pickup coil 176 mounted non-rotating on the bicycle frame, detector circuit 178 detects signal in the pickup coil and converts it to a digital signal as an input to a computer 180. A field of data from each crank is defined as the readings from each of the two strain gage bridges. The fields of data from each crank are combined with the crank angle measurement indicated by potentiometer 118 (FIG. 3). An angle sensor is comprised of plunger means (e.g., cam followers 114 and pins 120 (FIG. 3)) in contact with face cam 112 (FIG. 3) attached to off side crank 100. Voltage of the potentiometer indicates the crank angle and gives force vectors position relativity. The position relative data set is assembled by the microcomputer and prepared for either real time output, or data storage for later processing. In real time, it is output through the USB connector 182. Simultaneously it is stored as data in removable storage card 184.

Figure 5:
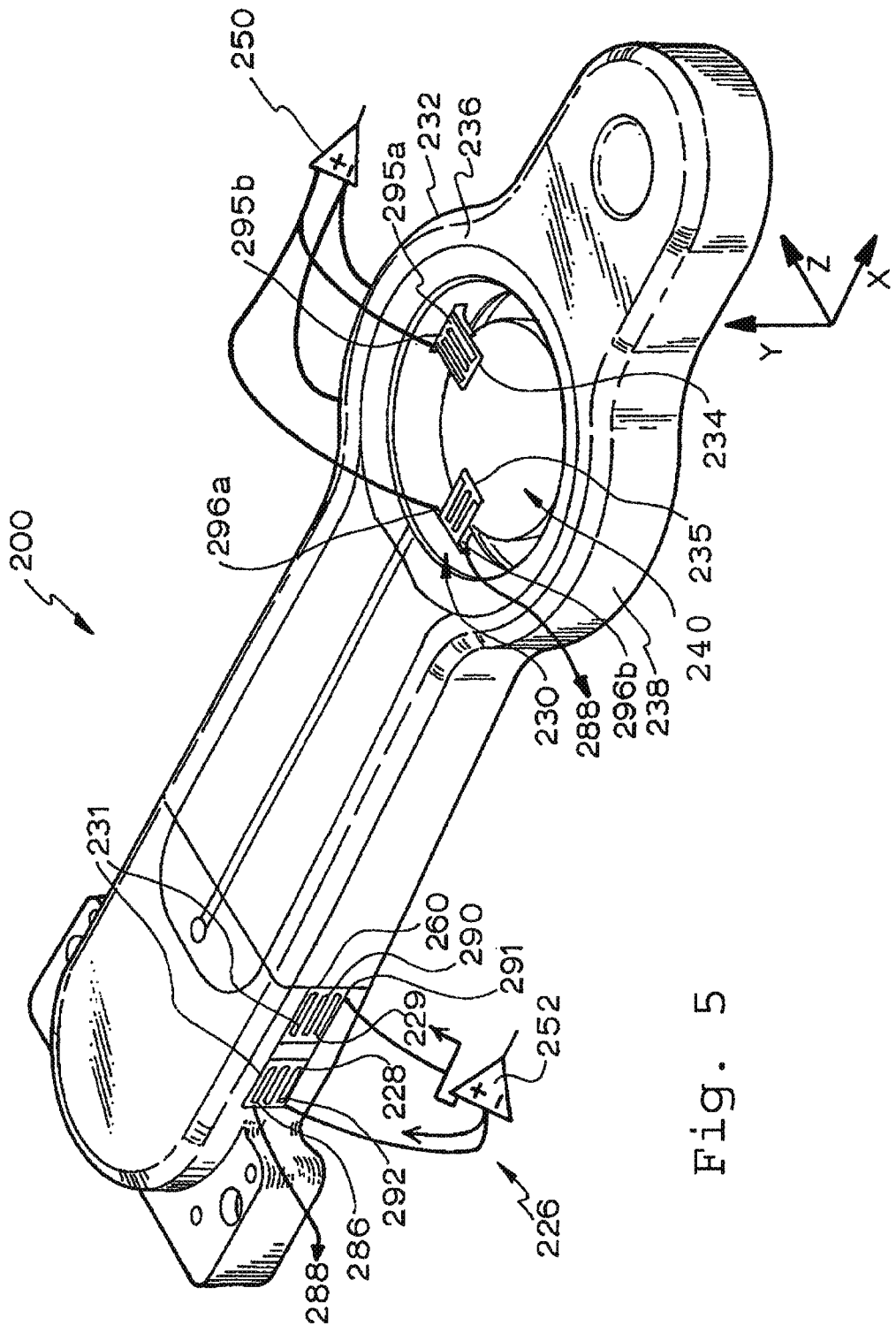
FIG. 5 is a perspective view of a crank arm in accordance with another preferred embodiment of the present invention.
Figure 6:
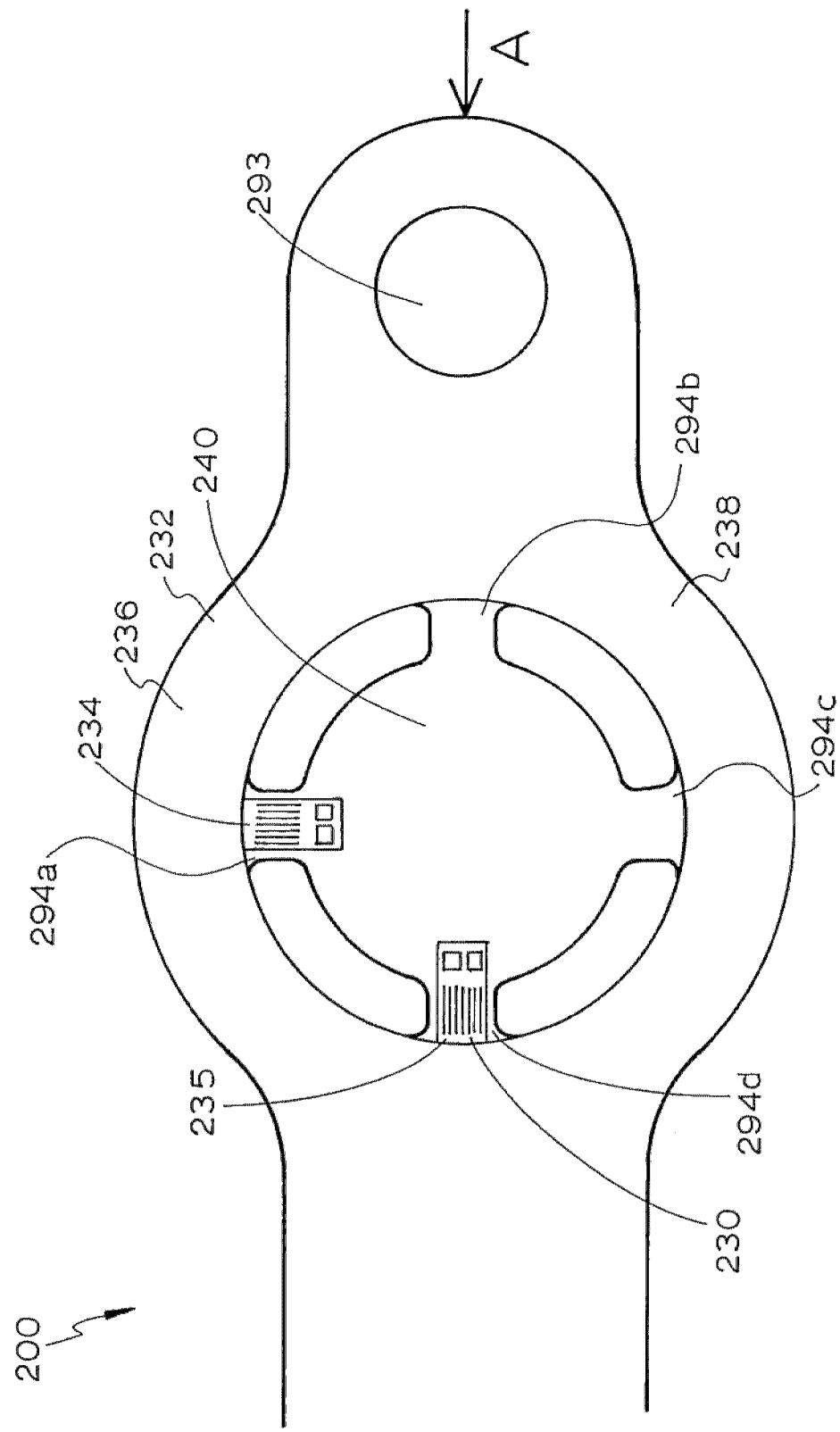
FIG. 6 is a partial front elevation view of the crank arm of FIG. 5.

FIGS. 5 and 6 show another preferred embodiment of the crank arm and sensor arrangements. The structure of crank arm 200 is similar to that of crank arm 100, so unless otherwise noted, the description of crank arm 100 will be understood to apply to crank arm 200 as appropriate. In general, crank arm 200 is similar to crank arm 100 except that the configuration of each of the detector systems and the amplifier is different. Referring to FIG. 5, the crank force measuring system is comprised of two mechanically separate measuring systems (first detector system 226 and second detector system 230 with amplifier 232) each of which measures one force vector.

The mechanical arrangement for measuring the tangential force vector, first detector system 226, is comprised of a bridge of strain gages mounted on the crank arm 200. Part of the bridge arrangement consists of two strain gages 228, 229 bonded to the arm and having strain measuring grids 231. The gages for completing the bridge arrangement on the diametrically opposite side of the crank are not shown.

The strain gages 228, 229 are bonded to the crank on the neutral axis for bending from the force $F_{OP}$ (FIG. 2). Gages 228, 229 are also relatively insensitive to torsion in the crank arm $M_{twist}$ (FIG. 2). A principal vector force of interest is the orthogonal force loading of the pedal mounting, in the X-Z plane (FIG. 5). The bridges are optimally arranged to be at a region of the crank of high strain to obtain the largest signal from the strain gages. The mounting of the strain gages 228, 229 are disposed about the neutral strain axis of the crank in the X-Y plane, and the grid elements 231 of the strain gages are aligned parallel with the long axis of the crank. Therefore when the crank is deflected in the X-Z plane by force impressed on the pedal, grid elements 231 are strained and the strain gage reflects a signal proportional to the amount of force. Because the sensor is aligned on the neutral axis, there is no unwanted signal from lateral forces in the out of axis X-Y plane and the gages are maximally sensitive to the strain generated by force on the pedal, $F_{TAN}$ (FIG. 1).

With continued reference to FIG. 5, an exemplary arrangement for producing a signal via gages 228, 229 is set forth as follows. Terminal 286 of gage 228 is connected to ground 288. Drive from a voltage switch 260 is connected to a terminal 290 of gage 229. Terminals 291, 292 are both connected to the inputs of instrumentation amplifier 252. Amplifier 252, connected to strain gages 228, 229, generates a signal at its output related to bending force in the crank. Gages on one side of the crank, e.g., gages 228, 229, will be in tension while gages on the opposite side of the crank will be in compression. Reference is made to the circuit system set forth above in relation to crank arm 100 and the diagram in FIG. 4, the arrangement of which is applicable to the embodiment of crank arm 200.

Referring now to FIG. 6, the physical and mechanical details of a preferred embodiment of detector system 230 and amplifier 232 are shown in expanded detail plan view. The pedal end portion of crank arm 200 has the pedalling force of the rider applied to the crank arm through the pedal mounting hole 293. The radial component of this force is preferably mechanically amplified by a ring amplifier having arcuate upper and lower strain amplifying members 236, 238. To measure the vector forces occurring at the pedal spindle, it is usually necessary for the measurement system to respond only to $F_{RAD}$ and $F_{TAN}$ and to no other forces applied to the crank arm. Therefore the gages employed would need to be bonded exactly about the neutral strain axes to minimize or reject extraneous forces. In practice there is difficulty in achieving this. To achieve a high level of rejection of unwanted signal, the gages would need to be positioned with accuracy of the order of a fraction of a millimeter. An alternative is to employ the very small movement of the amplifying members to a thin strain bridge element or web 240. Web 240 is narrowed at the connections to further amplify the strain and to create more flexibility at the connection to the main upper and lower strain amplifier members. In particular, the amplified strain is reflected in web 240 attached to the upper and lower strain amplifier members 236, 238 by narrow connecting spokes 294a, 294b, 294c and 294d. Mounted on some of the connecting spokes are strain gages 234, 235 having measuring grids aligned to measure the radial strain in the corresponding spoke. Web 240 is positioned to be equally displaced about the neutral Y axis in the X-Z plane. When positioned around the neutral axis to bending, the $F_{RAD}$ signal will preferably not be responsive to other out of plane forces.

When a compressive radial force is applied to the crank arm in the direction indicated by the arrow A, there is a resulting movement outwards of upper and lower strain members 236, 238. The outwards expansion of upper and lower members 236, 238 causes tensile strain development in spokes 294a and 294c, and consequently in strain gage 234. Simultaneously, outward movement of upper and lower members 236, 238 also causes compressive strain in spokes 294b, 294d and consequently compressive strain in strain gage 235. The gages in the strain amplifier produce a much larger signal in the gages than if they were directly applied to measure compressive strain in the crank. The two strain gages 234, 235 are electrically connected in series so as to form one arm of a bridge input for an instrumentation amplifier.

Thin web 240, is positioned about the centre of the crank to be on the neutral bending axis and therefore insensitive to bending forces and only sensitive to radial force in the crank arm. On the rear side of the narrow spokes 294a, 294d are bonded another pair of strain gages (not shown), also electrically connected in series to form the second arm of the bridge input for the instrumentation amplifier. The small strain in the crank arm 200 is transformed into a large strain in the attachment spokes of the mechanical strain amplifier.

An alternative placement for the strain gages on the rear of spokes 294a and 294d is on the rear of diametrically opposite spokes 294c and 294b with similar performance of the strain amplifier signal. Alternative means of electrically connecting the strain gages in a quarter bridge, half bridge or full bridge are also possible, and equivalent, in this embodiment.

With continued reference to FIG. 5, an exemplary arrangement for producing a signal via gages 234, 235 is set forth as follows. Each strain gage has two electrical connection terminals 295a, 295b and 296a, 296b. Two balancing strain gages (not shown) are bonded to the other side of the attachment web. When a voltage at terminal 295a is present, current flows through all strain gages and to ground 288. A signal related to strain is produced at connections 295b, 296a and connected to amplifier 250 inputs. Similar connections are made from the two gages (not shown) on the opposite side of the web. Connections from the gages not shown form the bridge completion resistors, as would be appreciated by those skilled in the art. The gages are bonded either side of the neutral axis for bending due to out of plane forces so they display an insignificant signal of bending of the crank in that plane. On a normal bicycle, force applied to the horizontal crank arm generates a large torsional force in the crank arm.

With web 240 in position as shown in FIGS. 5 and 6, there is insignificant signal generated due to torsion moment ($M_{twist}$ in FIG. 1).

Figure 7:
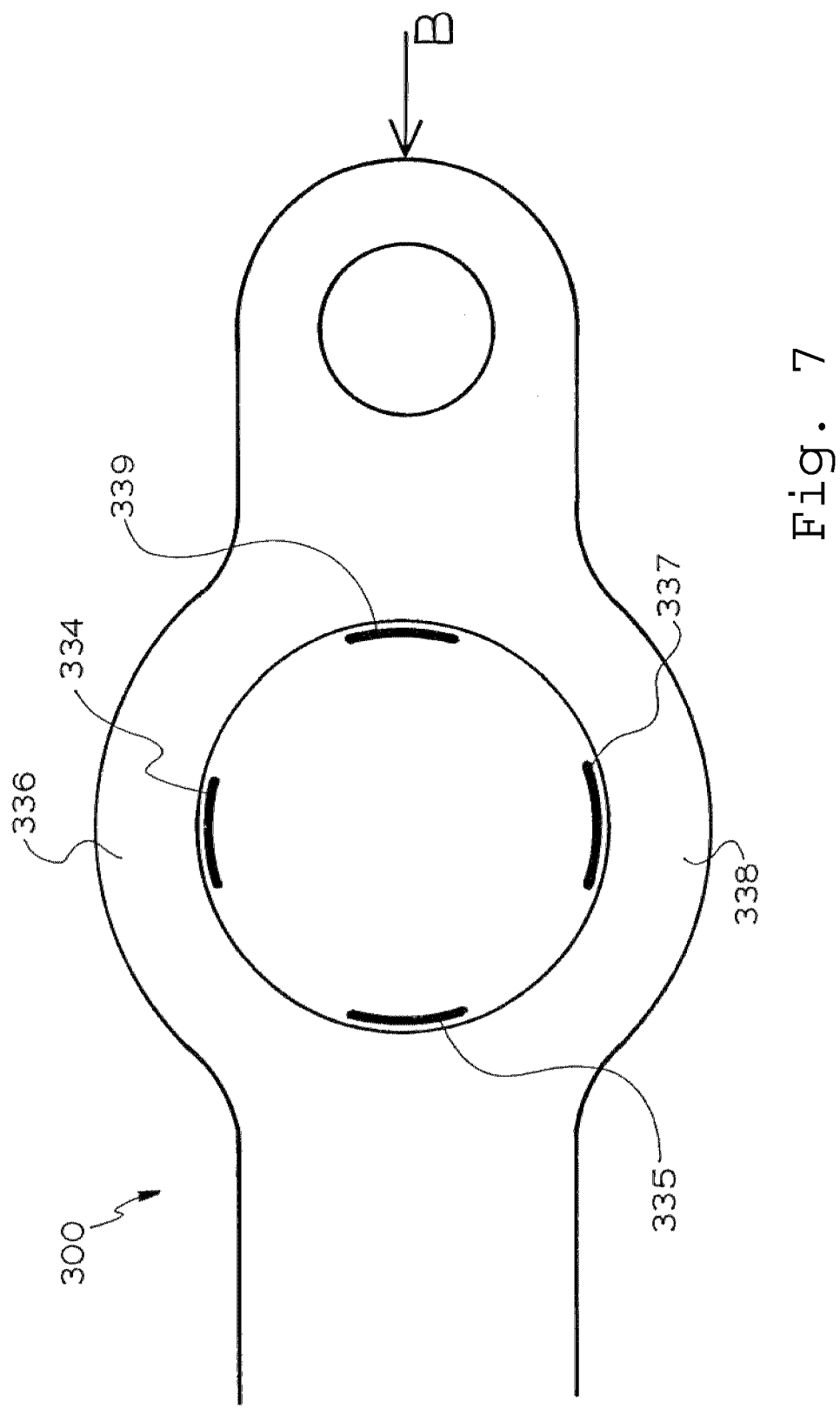
FIG. 7 is a partial front elevation view of a crank arm in accordance with a further preferred embodiment of the present invention.

FIG. 7 shows another preferred embodiment of the crank arm and sensor arrangements. The structure of crank arm 300 is similar to that of crank arm 200, so unless otherwise noted, the description of crank arm 200 will be understood to apply to crank arm 300 as appropriate. FIG. 7 shows an alternative configuration for the measurement of strain of the strain amplifier without a measurement web. The upper and lower strain amplifying members 336,338 expand outwards when a compressive force is applied to the crank arm in the direction indicated by arrow B. Strain gages 334, 335, 337 and 339 are bonded to the inside surface of the strain amplifier in the positions as shown in FIG. 7. When compressive strain is applied as indicated by direction B then strain gages 334, 337 indicate compressive strain while strain gages 335, 339 indicate tensile strain. In a similar manner as set forth above with respect to crank arm 200, any, or all, of gages 334, 335, 337 and 339 may be electrically connected in a quarter bridge, half bridge, or full bridge configuration.

Figure 8:
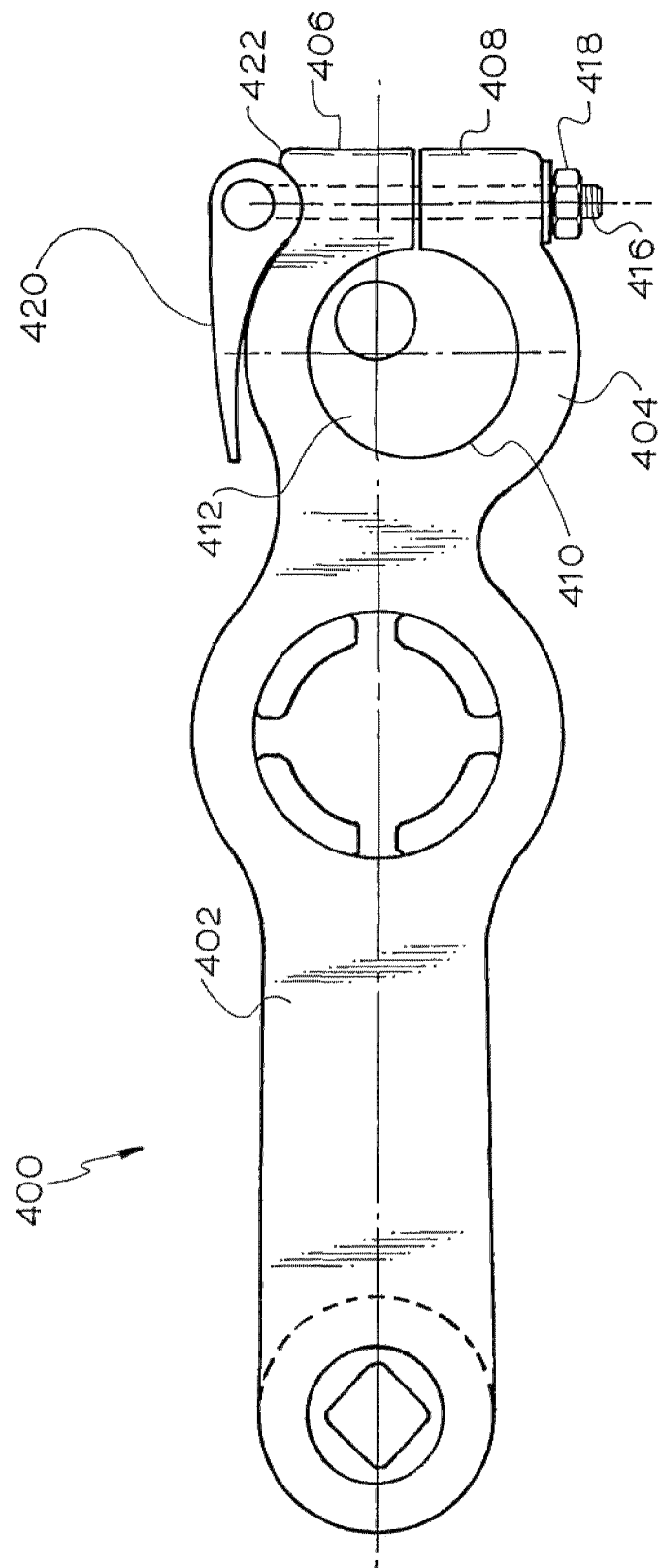
FIG. 8 is a rear elevation view of a crank arm having a pedal carrier that permits adjustment of pedal position along the length or height of the crank arm in accordance with another preferred embodiment of the present invention.
Figure 9:
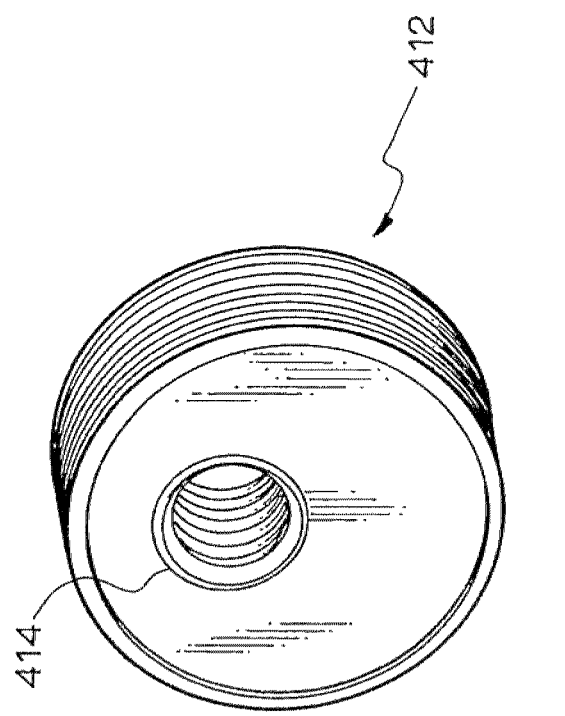
FIG. 9 is a perspective view of the pedal carrier of FIG. 8.

FIGS. 8 and 9 show another preferred embodiment of the present invention which permits the axle of the pedal to be adjusted relative to the crank arm. It will be understood that the numbering for the embodiment described in relation to FIGS. 8 and 9 is not intended to correspond to the numbering used to describe the embodiments set forth above. As shown in FIG. 8, crank arm 400 has a body 402 with a pedal end portion 404. End portion 404 preferably includes an upper portion 406 and a lower portion 408 that are moveable relative to one another along the central longitudinal horizontal plane. End portion 404 further includes an aperture 410 adapted to receive a pedal carrier 412.

As shown in FIG. 9, pedal carrier 412 includes an aperture 414 adapted to threadably receive an axle of a pedal. Aperture 414 is located off centre. The side surface of pedal carrier 412 is preferably to threadably engage corresponding threads in aperture 410 of end portion 404. Referring again to FIG. 8, end portion 404 includes a vertical aperture adapted to receive a draw screw 416. Draw screw 416 is secured at one end thereof by a locking nut 418, and at the other end by a locking cam 420. Locking cam 420 is adapted to bear against a camming surface 422 on the external surface of upper end portion 406.

In use, the axle position of a pedal may be adjusted along the length and/or height of the crank arm by placing pedal carrier 412 into aperture 410 until the outside plane faces of the pedal carrier are substantially flush with the sides of the crank arm. Pedal carrier 412 is preferably inserted into aperture 410 while end portions 406, 408 are untightened. The position of aperture 414 may be moved to a desired height along the height of crank arm 400, and/or to a desired length along the length of crank arm by rotating pedal carrier accordingly within aperture 410. Once pedal axle receiving aperture 414 is at a desired position, the user tightens end portions 406, 408 together by closing locking cam 420. To re-adjust, the user moves locking cam 420 to a release position and rotates pedal carrier 412 to move pedal axle receiving aperture 414 to another position.

The threaded nature of pedal carrier 412 has several advantages. For example, the threads prevent lateral movement of the pedal carrier. The tightening of upper and lower portions 406, 408 of the end of the crank arm is very effective in preventing rotation of the pedal carrier. Each thread can act as a wedge when the end portions are tightened leading to a multiplying effect of the tightening force.

To manufacture the crank, the crank may be CNC machined from a single solid block of high tensile strength aluminium. It is preferred that the web be machined from the parent material. This lowers hysteresis in the measurement. Connecting wires from the measurement cell are laid in a shallow trench machined into the surface of a face, but could also pass through a hole drilled up the centre of the crank. Forging is an alternative process, but would require machining. The crank arm may be manufactured from a variety of materials, for example only, an aluminium alloy, titanium, carbon fibre, chromoly steel, and/or other composite, metallic, and plastic materials.

The foregoing description is by way of example only, and may be varied considerably without departing from the scope of the present invention. For example only, the ring amplifier may be configured in other shapes, such as elliptical or linear. The ring amplifier may be located along the crank arm in either direction (e.g., closer to the axle connection, or closer to or forward of the pedal connection). However, locating the ring amplifier closer to the axle connection will usually require the amplifier to be more robust with a corresponding drop in the capacity to amplify. The bridge element or web within the ring amplifier may be configured as a "plus" sign or a lattice. Other configurations are possible and may be used to connect with the upper and lower amplifying members. A cover, which may be transparent, may be attached to the sides of the crank arm to prevent debris from entering the cavity containing elements of the amplifier. The type, placement and number of sensors may be varied to meet a desired objective. The out of plane force may be measured and included in any calculations and analysis if desired. This would involve measurement along three axes and provide even greater accuracy. Appropriate sensors may be positioned accordingly to measure the $F_{OP}$, with the resulting data being factored into any profile or analysis.

The tangential force component may be measured at other locations along the crank arm. For example only, instead of, or in addition to measuring tangential forces near the axle connection of the crank, the tangential force may be measured at the same or near the same location as radial force. A self contained module may be included in a cavity in the crank with sensors arranged to detect radial strain and sensors arranged to detect tangential strain. Such a module may be secured to the crank arm body by way of, for example only, bonding, bolts, splines, and/or press fitting. The module (or any of the sensor arrangements) may be positioned forward of the pedal axle connection, e.g., at the very end of the crank arm, and surrounded in a carbon composite material or any of the other materials set forth above.

The electrical components may be powered by other means such as electromotive force generated by the rider, road vibration, wind, solar, piezoelectric, and/or battery, or any combination thereof. The data generated by the system may be stored onto an onboard computer and/or transmitted to a remote station. The crank arm may include a sensor or a magnet for use with determining cadence. The crank arm angle may be measured by other means such as, but not limited to a solid state gyro, or accelerometer (or combination thereof). Data generated by the components in or on the crank arm may be transmitted to an onboard computer via, for example, radio transmission (e.g., a 2.4 GHz radio network), inductive coupling, optical transmission, and/or ultrasonic transmission.

The present system and method may be configured for use on standard road bikes, triathlon bikes, mountain bikes, exercise bikes, or any other wheeled vehicle requiring an element of manual effort to move the vehicle. The present system and method may be used to generate an analysis of a rider's pedalling profile in order to train a rider to pedal more efficiently. This would have many advantages for a competitive cyclist. The system and method described herein may be adapted for use in broader applications, for example only, limb prosthesis, automobile suspensions, medical rehabilitation, arm crank ergometers, etc.

The features described with respect to one embodiment may be applied to other embodiments, or combined with or interchanged with the features other embodiments, as appropriate, without departing from the scope of the present invention.

It will of course be realised that the above has been given only by way of illustrative example of the invention and that all such modifications and variations thereto as would be apparent to persons skilled in the art are deemed to fall within the broad scope and ambit of the invention as herein set forth.

The invention claimed is:

1. A crank arm for a bicycle, comprising:
    a body having a first end portion with a pedal connection, a second end portion with an axle connection and a central longitudinal axis through said end portions;
    a mechanical strain amplifier adapted to amplify the effect of a radial force directed through said pedal connection, at least a portion of said amplifier being integrally formed with said body to form a cavity; and
    a strain detector operatively connected to said mechanical strain amplifier, the strain detector configured to detect amplified strain produced by the mechanical strain amplifier.

2. The crank arm of claim 1, wherein said mechanical amplifier includes a web aligned substantially parallel to a plane of rotation of the crank arm and passing through the central longitudinal axis.

3. The crank arm of claim 1, further comprising a strain detector proximate said axle connection.

4. The crank arm of claim 1, further comprising a means for measuring the crank angle during rotation of the crank arm.

5. A crank arm for a bicycle, comprising:
    a body having a first end portion with a pedal connection, a second end portion with an axle connection and a central longitudinal axis through said end portions, said body having a cavity which passes through the central longitudinal axis;
    a strain detector mounted within said cavity, said detector being aligned in a vertical plane passing through the longitudinal axis, said detector being adapted to detect an amplified radial force directed through said pedal connection; and
    a mechanical strain amplifier adapted to amplify the strain to be detected by said detector.

6. The crank arm of claim 5, wherein said amplifier is a mechanical amplifier, wherein said amplifier includes a web aligned substantially parallel to a plane of rotation of the crank arm and passing through the central longitudinal axis.

7. The crank arm of claim 5, further comprising a strain detector proximate said axle connection.

8. The crank arm of claim 5, further comprising a means for measuring the crank angle during rotation of the crank arm.

9. A method for determining force exerted by a rider on a bicycle, comprising:
    mechanically amplifying radial strain on a crank arm of the bicycle;
    detecting the amplified strain; and
    determining the effort exerted by the rider on the crank arm based at least in part on data obtained from the amplified strain.

10. The method of claim 9, wherein said step of detecting includes separately detecting strain due to a radial force and strain due to tangential force exerted by the rider on the crank arm.

11. The method of claim 9, wherein said step of determining includes measuring an angle of the crank arm during rotation of the crank arm by the rider.

12. A method for determining force exerted by a rider on a bicycle, comprising:
    mechanically amplifying radial strain on a crank arm of the bicycle while the rider is rotating the crank arm, and detecting the mechanically amplified strain;
    independently measuring the amount of radial force and tangential force exerted by the rider on the crank arm; and
    generating a pedalling profile of the user based at least in part on the measurements obtained.

13. The method of claim 12, further comprising measuring an angle of the crank arm during rotation of the crank arm by the rider.

14. A crank arm for a bicycle, comprising:
    a body having a first end portion with a pedal connection, a second end portion with an axle connection, a central longitudinal axis through said end portions, and a length from said first end portion to said second end portion;
    a first strain gage adapted to detect a mechanically amplified radial strain along a portion of said body; and
    a second strain gage adapted to detect a mechanically amplified strain along a portion of said body, said second strain gage being located at a different point along the length of said body relative to said first strain gage.

15. The crank arm of claim 14, wherein said first strain gage is located proximate said axle connection and said second strain gage is located proximate said pedal connection.

16. The crank arm of claim 14, further comprising a mechanical strain amplifier adapted to amplify the radial strain detected by at least one of the first strain gage and the second strain gage.

17. A crank arm for a bicycle, comprising:
    a body having a first end portion with a pedal connection, a second end portion with an axle connection, a central longitudinal axis through said end portions, and a length from said first end portion to said second end portion;
    a first strain gage adapted to detect a mechanically amplified radial strain along a portion of said body, said first strain gage having a plurality of grid elements substantially in a plane; and
    a second strain gage adapted to detect a mechanically amplified strain along a portion of said body, said second strain gage having a plurality of grid elements substantially in a plane, the plane of grid elements of said first strain gage being non-parallel to the plane of grid elements of said second strain gage.

18. The crank arm of claim 17, wherein the plane of grid elements of said first strain gage is orthogonal to the plane of grid elements of said second strain gage.

19. The crank arm of claim 17, further comprising a mechanical strain amplifier adapted to amplify the strain detected by one of the first strain gage and second strain gage.

20. A crank arm for a bicycle, comprising:
    a body having a first end portion with a pedal connection, a second end portion with an axle connection, a central longitudinal axis through said end portions, and a length from said first end portion to said second end portion; and
    a strain gage adapted to detect a mechanically amplified radial strain along a portion of said body, said body having an expandable portion adapted to amplify the radial strain to be detected by said strain gage.

21. The crank arm of claim 20, wherein said expandable portion includes opposed upper and lower arcuate members.

22. The crank arm of claim 20, wherein said expandable portion is located proximate said pedal connection.

23. A method for determining force exerted by a rider on a bicycle, comprising:
  detecting two non-parallel components of mechanically amplified strain on a crank arm of the bicycle, at least one of said components including a mechanically amplified radial strain; and
  determining the effort exerted by the rider on the crank arm based at least in part on data obtained from the strain detected.

24. A method for determining force exerted by a rider on a bicycle, comprising:
  detecting mechanically amplified radial strain on a crank arm of the bicycle at two different locations along a length of the crank arm; and
  determining the effort exerted by the rider on the crank arm based at least in part on data obtained from the strain detected.

25. A method for determining force exerted by a rider on a bicycle, comprising:
  measuring a mechanically amplified radial force exerted by the rider on a pedal while the rider is pedalling the bicycle;
  measuring a mechanically amplified tangential force exerted by the rider on the pedal while the rider is pedalling the bicycle; and
  determining the effort exerted by the rider while pedalling based at least in part on data obtained from the radial and tangential forces measured.

26. A strain amplifier for amplifying strain applied to a longitudinal member, the strain amplifier comprising:
  first and second strain amplifying arms defining and separated by a cavity, whereby the longitudinal member is interrupted by the strain amplifying arms and by the cavity; and
  at least one strain sensor;
  wherein longitudinal strains applied to the longitudinal member are radially amplified by the arms such that amplified radial strain is detectable by the at least one strain sensor.

27. The strain amplifier of claim 26 wherein the longitudinal member is one of: a limb prosthesis, an automobile suspension arm, a medical rehabilitation device member, a bicycle crank, and an arm crank of an ergometer.

28. The strain amplifier of claim 26 further comprising a web within the cavity aligned parallel to an expected plane of strain upon the longitudinal member, the strain sensor being mounted upon the web.

29. The strain amplifier of claim 26 wherein the strain amplifier comprises a module secured within a cavity of the longitudinal member.

30. The strain amplifier of claim 26 wherein the at least first and second strain amplifying arms are at least one of: arcuately shaped to linearly amplify strain; elliptically shaped; linearly shaped.

31. The strain amplifier of claim 26 wherein the at least one strain sensor is mounted upon at least one of the first and second strain amplifying arms.

* * * * *